United States Patent
Zeiner et al.

(10) Patent No.: US 10,040,126 B2
(45) Date of Patent: Aug. 7, 2018

(54) CUTTING TOOL AND METHOD OF MANUFACTURING A CUTTING TOOL

(71) Applicant: SUMITOMO ELECTRIC HARDMETAL CORP., Itami-shi (JP)

(72) Inventors: Christoph Zeiner, Willich (DE); Makoto Abe, Willich (DE)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 0 days.

(21) Appl. No.: 15/320,580

(22) PCT Filed: Jun. 23, 2014

(86) PCT No.: PCT/JP2014/003358
§ 371 (c)(1),
(2) Date: Dec. 20, 2016

(87) PCT Pub. No.: WO2015/198361
PCT Pub. Date: Dec. 30, 2015

(65) Prior Publication Data
US 2017/0144229 A1 May 25, 2017

(51) Int. Cl.
*B23B 27/18* (2006.01)
*B23B 27/00* (2006.01)

(52) U.S. Cl.
CPC ............ *B23B 27/18* (2013.01); *B23B 27/005* (2013.01); *B23B 27/007* (2013.01);
(Continued)

(58) Field of Classification Search
CPC ... B23B 2250/12; B23B 27/007; B23B 27/18; B23B 2226/125; B23B 2240/08; B23B 27/005
See application file for complete search history.

(56) References Cited

U.S. PATENT DOCUMENTS

| 938,434 | A | * | 10/1909 | Pierpont | B23C 3/16 407/57 |
| 3,184,242 | A | * | 5/1965 | Rainey | G11B 3/44 369/173 |

(Continued)

FOREIGN PATENT DOCUMENTS

| CA | 2290023 A1 | 12/1998 |
| CN | 201760617 U | 3/2011 |

(Continued)

OTHER PUBLICATIONS

International Search Report in counterpart International Patent Application No. PCT/JP2014/003358, dated Sep. 5, 2014.
(Continued)

*Primary Examiner* — Sara Addisu
(74) *Attorney, Agent, or Firm* — Venable LLP; Michael A. Sartori; Laura G. Remus (57) ABSTRACT

The present invention provides a cutting tool which comprises a cutting tool insert with a tip portion of cBN material having a cutting edge formed therein and a base portion forming a sintered composition with the tip portion, and a body portion coupling the cutting tool insert with a shank of the cutting tool, wherein the cutting tool insert has a rake face and a first flank face defining the cutting edge. The rake face has a negative rake angle relative to an axis parallel to a center axis of the body portion. A second flank face defining a further edge with the first flank face is formed such that the cutting edge and the further edge do not have a common vertex. The second flank face is tilted with respect to an axis parallel to a center axis of the body portion by an angle greater than 0°.

11 Claims, 8 Drawing Sheets

(52) U.S. Cl.
CPC ..... *B23B 2226/125* (2013.01); *B23B 2240/08* (2013.01); *B23B 2250/12* (2013.01)

(56) References Cited

U.S. PATENT DOCUMENTS

| | | | | |
|---|---|---|---|---|
| 4,260,299 A * | 4/1981 | Ryan | ..................... | B23F 21/226 407/115 |
| 5,022,797 A * | 6/1991 | Sawa | ..................... | B23B 27/20 407/119 |
| 5,149,234 A * | 9/1992 | Durfee, Jr. | .............. | B23B 51/00 408/199 |
| 5,209,612 A * | 5/1993 | Kish | ..................... | B23C 5/1009 407/54 |
| 5,272,940 A | 12/1993 | Diskin | | |
| 5,362,183 A * | 11/1994 | Alario | ..................... | B23B 27/06 407/119 |
| 5,374,142 A * | 12/1994 | Masseth | ................ | B23F 21/226 407/113 |
| 6,095,723 A * | 8/2000 | Reynolds | ................. | B23B 51/00 407/54 |
| 6,491,481 B1 * | 12/2002 | Border | ................ | B29C 33/3842 29/557 |
| 7,178,433 B2 * | 2/2007 | Matsuda | ................... | B23B 1/00 407/113 |
| 7,240,593 B2 * | 7/2007 | Little | ..................... | B23B 27/10 407/101 |
| 7,614,831 B2 * | 11/2009 | Liu | ..................... | B23B 27/005 407/113 |
| 8,021,085 B1 * | 9/2011 | Nelson | ..................... | B23C 5/10 407/54 |
| 2003/0223830 A1 * | 12/2003 | Bryan | ................... | B29C 59/022 407/119 |
| 2004/0228694 A1 | 11/2004 | Webb et al. | | |
| 2006/0120816 A1 * | 6/2006 | Morimoto | ................. | B23B 1/00 409/132 |
| 2007/0172321 A1 | 7/2007 | Nagai | | |
| 2007/0207715 A1 * | 9/2007 | Webb | ................... | B23B 27/145 451/540 |

FOREIGN PATENT DOCUMENTS

| | | |
|---|---|---|
| DE | 20307124 U1 | 7/2003 |
| JP | 1-106102 U | 7/1989 |
| JP | H09-272104 A | 10/1997 |
| JP | H10-128603 A | 5/1998 |
| JP | H10-193203 A | 7/1998 |
| JP | 2003-071608 A | 3/2003 |
| JP | 2010-120144 A | 6/2010 |
| JP | 2014-094423 A | 5/2014 |
| WO | 98/56528 A1 | 12/1998 |

OTHER PUBLICATIONS

International Preliminary Report on Patentability in counterpart International Patent Application No. PCT/JP2014/003358, dated Sep. 1, 2016.

* cited by examiner

CUTTING TOOL AND METHOD OF MANUFACTURING A CUTTING TOOL

TECHNICAL FIELD

The present invention relates to a cutting tool having a cutting tool insert with a negative rake angle and to a cutting tool having a cutting tool insert with a rake face and two flank faces, the rake face defining a cutting edge with a first of the two flank faces and a second flank face being tilted relative to a centre axis of the cutting tool by an angle greater than 0°. Furthermore, the present invention relates to a method of manufacturing respective cutting tools.

BACKGROUND ART

Boring tools for processing hard materials, such as metal work pieces, having a cutting edge formed of cBN (cubic boron nitride) material are known in the art. For example, some known cutting tools have a cBN blank which is brazed to a shank of carbide material. Particularly, boron nitride is an attractive material because it has, besides diamond, a comparatively high abrasion resistance and particularly cubic boron nitride (cBN) is the second hardest material after diamond, while showing a chemical and thermal stability that is even greater than that of diamond. A high abrasion resistance and defect resistance is particularly desirable in the processing of boreholes with small inner diameter in hard materials for exactly and reproducibly processing. Despite having a high brittleness, cBN is also very expensive. Furthermore, due to its high hardness, cBN cannot be easily processed as compared to, for instance, metal materials.

Figure 1:
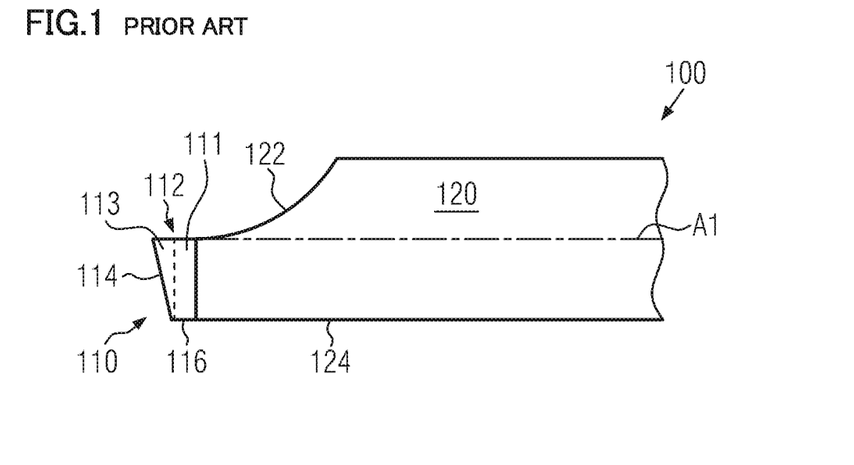
FIG. 1 schematically illustrates a conventional cutting tool.

FIG. 1 schematically illustrates a known cutting tool 100 having a cutting tool insert 110 and a shank body 120. The cutting tool insert 110 is formed by a base 111 and a cutting part 113 sintered together to form a sintered body composition as indicated by the broken line in FIG. 1. The cutting tool insert 110 is fixed to the shank body 120 by brazing. Usually, the cutting tool insert 110 is allotted as a diamond sintered compact and a cBN sintered compact due to the expensive materials involved, particularly only the cutting part 113 being usually formed from cBN to provide an excellent abrasion resistance at the cutting tool insert 110.

The cutting tool insert 110 further has a rake face 112 and a first flank face 114 which define a cutting edge there between. In operation, material of a workpiece (not illustrated) fed to the cutting edge chips along the rake face 112 of the cutting tool insert 110 while an inclination of the first flank face 114 with regard to the rake face 112 provides a clearance between the cutting tool insert and a workpiece surface (not illustrated), therefore no part of the cutting tool besides the cutting edge is in contact with the workpiece. The rake face 112 extends into the shank body 120 due to a rake face 122 formed on the shank body 120. The rake face 122 of the shank body 120 represents a curved surface which is curved such that a clearance between the rake face and a workpiece (the clearance on the rake face is often referred to as "chip pocket on the rake face") is sufficient to receive the chip and to guide the chip away from the cutting edge.

Adjacent to the first flank face of the cutting tool insert 110 a second flank face 116 of the cutting tool insert 110 is located, which a second flank face 116 extends into a flank face 124 of the shank body 120.

The rake face 112 of the cutting tool insert 110 is aligned to a centre axis A of the shank body 120. Therefore, the rake face 112 and the centre axis A1 coincide along the cutting tool insert 110, an according configuration being conventionally referred to as a "rake face with 0°".

A cutting tool as discussed with regard to FIG. 1 is known from document JP 10128603 A.

CITATION LIST

Patent Literature

PTL 1: JP 10128603 A

SUMMARY OF INVENTION

Technical Problem

In conventional cutting tools, such as the cutting tool 100 shown in FIG. 1, an accurate formation of the rake face of the cutting tool insert and the shank body is not as exact as desired. Further, the chip pocket under the first flank face is very small and may not receive enough material as it is necessary when processing holes with very small inner diameter. The cutting chip discharge properties of known cutting tools do not allow a sufficiently exact processing of holes with very low inner diameter.

Solution to Problem

The present invention has been made in order to solve the abovementioned problems of the prior art.

In one aspect of the present invention, a cutting tool is provided, the cutting tool comprising a cutting tool insert with a tip portion of cBN material having a cutting edge formed therein and a base portion forming a sintered composition with the tip portion, and a body portion coupling the cutting tool insert with a shank of the cutting tool, wherein the cutting tool insert has a rake face and a first flank face defining the cutting edge, and wherein the rake face has a negative rake angle relative to an axis parallel to a centre axis of the body portion. The cutting tool of this aspect has a protected cutting edge due to the negative rake angle.

In some special illustrative embodiments herein, the cutting tool insert may further comprise a second flank face defining a further edge with the first flank face such that the cutting edge and the further edge do not have a common vertex, and wherein the second flank face is tilted with respect to the axis parallel to the centre axis of the body portion by an angle greater than 0°.

In a further aspect of the present invention, a cutting tool is provided, the cutting tool comprising a cutting tool insert with a tip portion of cBN material having a cutting edge formed therein and a base portion forming a sintered composition with the tip portion, and a body portion coupling the cutting tool insert with a shank of the cutting tool, wherein the cutting tool insert has a rake face and a first flank face defining the cutting edge and a second flank face defining a further edge with the first flank face such that the cutting edge and the further edge do not have a common vertex, wherein the second flank face is tilted with respect to an axis parallel to a centre axis of the body portion by an angle greater than 0°. In this aspect, a chip pocket as provided at the second flank face is greater than chip pockets on flank faces of known cutting tools and therefore the cutting tool provided in this aspect has improved chip discharge properties.

In another aspect of the present invention, a method of manufacturing a cutting tool is provided, the method comprising providing a body portion, providing a cutting tool insert portion, performing a brazing process for connecting the cutting tool insert portion and the body portion at a common interface, and performing a grinding process for forming a rake face in the cutting tool insert portion, the rake face having a negative rake angle relative to an axis parallel to a centre axis of the body portion, and forming a cutting edge in the cutting tool insert portion.

In some special illustrative embodiments herein, forming the cutting edge may comprise forming a first flank face in the cutting tool insert portion, the first flank face and the rake face defining the cutting edge, and forming a second flank face defining a further edge in the cutting tool insert portion, the cutting edge and the further edge not having a common vertex, wherein the second flank face is tilted with respect to an axis parallel to a centre axis of the body portion by an angle greater than 0°.

In another aspect of the present invention, a method of manufacturing a cutting tool is provided, the method comprising providing a body portion, providing a cutting tool insert portion, performing a brazing process for connecting the cutting tool insert portion and the body portion at a common interface, forming a cutting edge in the cutting tool insert portion by performing a grinding process for forming a rake face in the cutting tool insert portion and performing a further grinding process for forming a first flank face, the first flank face and the rake face defining the cutting edge, and forming a second flank face defining a further edge with the first flank face such that the cutting edge and the further edge do not have a common vertex, wherein the second flank face is tilted with respect to an axis parallel to a centre axis of the body portion by an angle greater than 0°.

In another aspect of the present invention, a boring tool may be provided, the boring tool comprising a shank and abovementioned cutting tool, the shank being coupled to the cutting tool in forming a contact interface with the body portion.

Advantageous Effects of Invention

It is an advantage of the aforementioned aspect to provide a greater chip pocket on the second flank face of a cutting tool insert.

It is an advantage of the aforementioned aspect to increase the chip pocket on the second flank face of cutting tool inserts without reducing an interface between the cutting tool insert and a body portion coupling the cutting tool insert with a shank of the cutting tool.

It is an advantage of the aforementioned aspect to allow for easier fabrication of the cutting edge especially for cutting tool inserts intended for use in the processing of holes with small diameters.

It is an advantage of the aforementioned aspect to provide cutting tools with improved abrasion and cutting characteristics due to protected cutting edges.

BRIEF DESCRIPTION OF DRAWINGS

The aforegoing and other objects, features, aspects and advantages of the present invention will become more apparent from the following detailed description of the present invention when taken in conjunction with the accompanying drawings, wherein.

DESCRIPTION OF EMBODIMENTS

Figure 2:
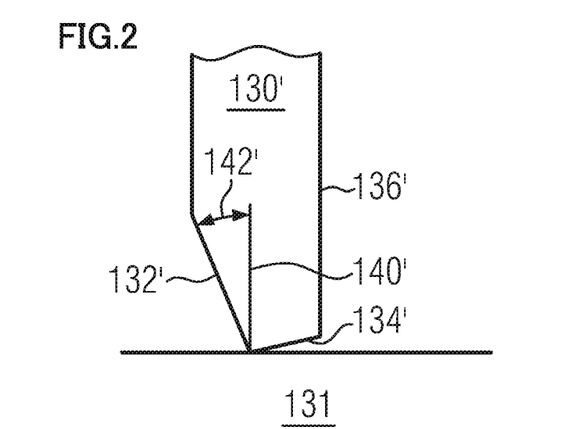
FIG. 2 schematically illustrates different conventions for the rake angle as used in the present disclosure.
Figure 3:
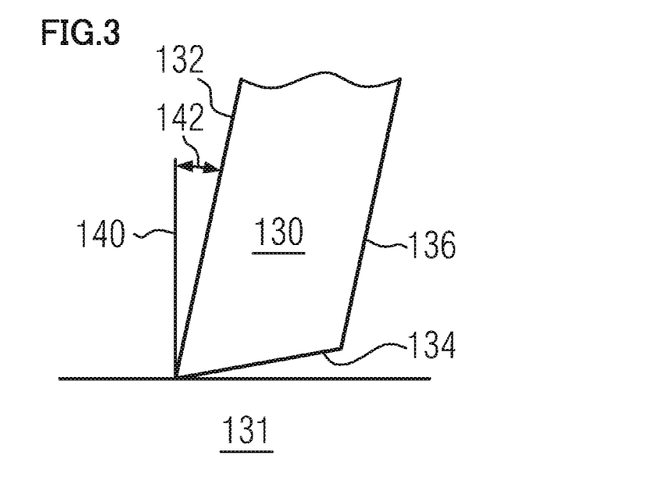
FIG. 3 schematically illustrates different conventions for the rake angle as used in the present disclosure.

With regard to FIGS. 2 and 3, the expression "rake angle" as used throughout the present specification will be defined. FIG. 2 illustrates a cutting tool 130' contacting a surface of a workpiece 131 for further processing. The cutting tool 130' has a rake face 132' and a first flank face 134' defining a cutting edge which is depicted in FIG. 2 as a contact vertex between the cutting tool 130' and the workpiece 131. Furthermore, the cutting tool 130' has a second flank face 136' in contact with the first flank face 134' such that a chip pocket is formed between the first flank face 134' and the surface of the workpiece 131. Line 140' indicates an axis parallel to a centre axis (not illustrated) of the cutting tool 130' which contacts the surface of the workpiece 131 in the cutting edge. The rake angle is defined by an angle 142' enclosed by the rake face 132' and the axis 140'. An orientation of the rake angle 142' is further defined such that a counterclockwise rotation of the axis 140' by the angel 142' rotates the axis 140' into the rake face 132' defines the rake angle 142' to be negative, i.e. the rake angle 142' as depicted in FIG. 2 is referred to as "negative rake angle". Therefore, negative rake angles will be understood throughout the present description as oriented in accordance with the illustration in FIG. 2 and as explained above.

On the other hand, FIG. 3 illustrates a cutting tool 130 disposed on the surface of a workpiece 131, the cutting tool 130 having a rake face 132, a first flank face 134 and a second flank face 136. Herein, the rake angle is defined by an angle 142 formed between the rake face 132 and an axis 140 parallel to a centre axis of the cutting tool 130 (not illustrated) and parallel to a surface normal the workpiece 131. Herein, a clockwise rotation of the axis 140 by the rake angle 142 rotates the axis 140 into the rake face 132 defines the rake angle to be negative, i.e. the rake angle 142 as depicted in FIG. 3 is referred to as "positive rake angle". Therefore, positive rake angles will be understood throughout the present description as oriented in accordance with the illustration in FIG. 3 and as explained above.

Therefore, the expression "negative rake angle" is to be understood in accordance with the explanations above provided with regard to FIG. 2, while the expression "positive rake angle" is to be understood in accordance with the explanations provided above with regard to FIG. 3. Additionally, in the case of the rake angle 142' and 142, respectively, becoming 0, i.e. the axis 140' and 140, respectively becoming identical with the rake face, the rake angle is referred to as "rake angle of 0°". In this regard, the cutting tool 100 as illustrated in FIG. 1 has a rake angle of 0°.

Figure 4:
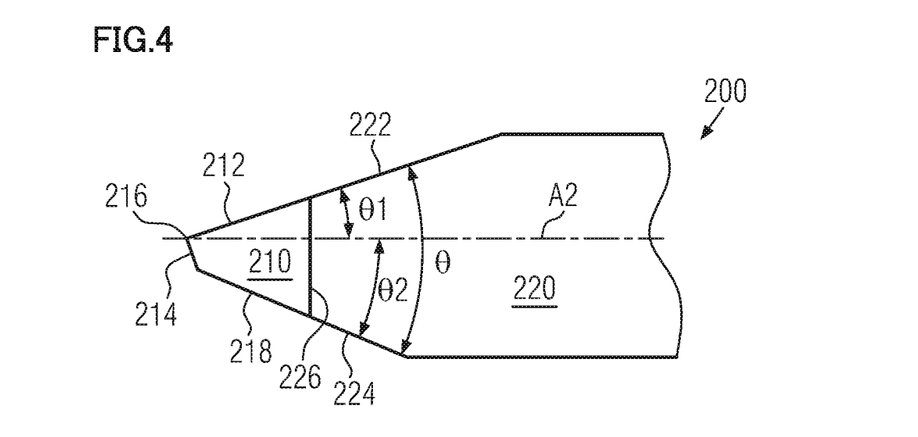
FIG. 4 schematically illustrates a cutting tool in accordance with some illustrative embodiments of the present invention.
Figure 5:
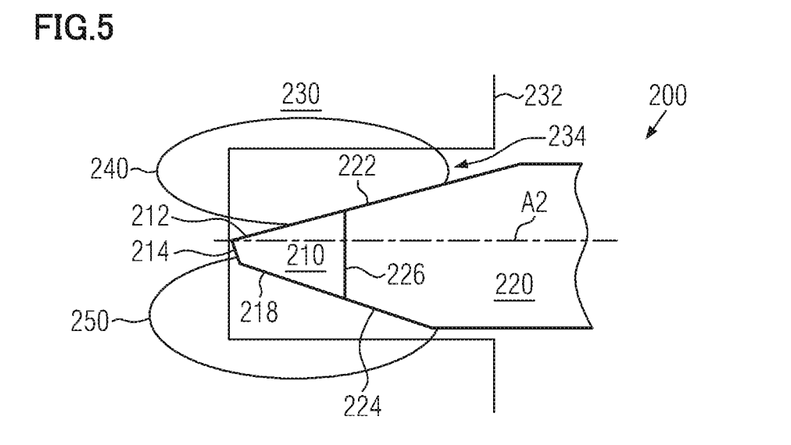
FIG. 5 schematically illustrates a cutting tool in accordance with some illustrative embodiments of the present invention.

Some illustrative embodiments of the present invention will be now described with regard to FIGS. 4 and 5.

FIG. 4 schematically illustrates a cutting tool 200 having a cutting tool insert 210 and a body portion 220 which may be, for example, formed of carbide and which couples the cutting tool insert 210 with a shank (not illustrated) of the cutting tool 200. In some illustrative embodiments, the cutting tool insert 210 is a sintered composition of a tip portion formed of cBN material and a base portion formed of carbide material, both sintered together as will be described in greater detail below. In some alternative examples, the base portion may be formed of cermet.

The cutting tool insert 210 has a rake face 212 and a first flank face 214 defining a cutting edge 216. Adjacent to the first flank face 214, a second flank face 218 is formed such that the first flank face 214 and the second flank face 218 define another edge that does not have a common vertex with the cutting edge 216. Herein, the expression "not having a vertex in common" means that the further edge defined by the first and second flank faces 214 and 218 and the cutting edge 216 do not intersect. It is noted that edges having a vertex in common are adjacent edges that join in a vertex.

The body portion 220 has a rake face 222 joining the rake face 212 of the cutting insert tool. The special illustrative example, as illustrated in FIG. 4, shows the rake face 222 and the rake face 212 as forming a flat smooth rake surface of the cutting tool 200 (indicated in the cross sectional view of FIG. 4 as a single straight line). However, this does not pose any limitation to the present disclosure and in general, the rake faces 212 and 222 may join forming an edge such that the rake face 212 of the cutting tool insert and the rake face 222 of the body portion 220 represent distinctive faces formed in the cutting tool 200 (would be indicated in an according modification of FIG. 4 as two straight lines forming a kink).

The body portion 220 further has a flank face 224 which represents a smooth extension of the second flank face 218 of the cutting tool 210 into the body portion 220 (indicated in the cross-section view of FIG. 4 as a single straight line). However, this does not pose any limitation to the present disclosure and alternatively, the second flank faces 218 and 224 may join in a line such that two distinctive flank faces are formed in the cutting tool 200 (would be indicated in an according modification of FIG. 4 as two straight lines forming a kink).

In a special illustrative example, the rake face 212 of the cutting tool insert 210 and the rake face 222 of the body portion 220 form a smooth rake face in the cutting tool 200, as illustrated in FIG. 4. Alternatively or additionally, the second flank face 218 and the flank face 224 form a smooth second flank face of the cutting tool 220. Therefore, the rake face 212, 222 of the cutting tool 200 is a flat face formed in the cutting tool insert 210 and the body portion 220. Furthermore, the second flank face 218, 224 of the cutting tool 220 may be a flat face formed in the cutting tool insert 210 and the body portion 220.

As depicted in FIG. 4, the rake face 212, 222 of the cutting tool 200 forms a negative rake angle THETA1 with an axis A2 of the body portion 220 which is substantially parallel to a centre axis (not illustrated) of the body portion 220 and intersects the cutting edge 216. The second flank face 218, 224 of the cutting tool 200 forms a second angle THETA2 with the axis A2. In special illustrative examples herein, the negative rake angle THETA1 has an absolute value in a range from 5° to 40°. In other special illustrative examples herein, the negative rake angle THETA1 has an absolute value in a range from 10° to 30°. The negative rake angle THETA1 may be chosen to balance the sharpness and toughness of the cutting edge 216. The negative rake angle THETA1 protects the cutting edge 216 and a brazing interface 226 of sufficient size is achieved between the cutting tool insert 210 and the body portion 220. Therefore, in spite of forming a second flank face 218, 224 being inclined relative to the axis A2 by the angle THETA2 for increasing a chip pocket volume on the second flank face 214, 218 of the cutting tool 200 (described below in greater detail), the brazing interface 226 is not reduced. In special illustrative examples herein the angle THETA2 has an absolute value in a range from 25° to 60°. Accordingly, the stability of the cutting tool 200 is increased by the negative rake angle THETA1.

In some illustrative embodiments, the negative rake angle THETA1 and the angle THETA2 are appropriately chosen such that the brazing interface 226 having an appropriate size is provided. For example, the brazing interface 226 having a size given by diameter (indicated by line 226 in the cross-sectional view of FIG. 4) of at least 40% of a cutting tool diameter, such as a maximum diameter of the body portion 220, may be formed. Advantageously, in forming the second flank face 218, 224 being inclined relative to the axis A2 by the angle THETA2, the chip pocket on the flank face of the cutting tool 200 is increased as will be described in greater detail with regard to FIG. 5 below. Therefore in special illustrative examples herein the angle THETA has an absolute value in a range from 35° to 70°.

FIG. 5 illustrates the cutting tool 200 during processing of a hole 234 formed in a surface 232 of a workpiece 230. In some particular applications of the present invention, the hole 234 may represent a hole with very low inner diameter, such as for example diameters of 10 mm and less, or 5 mm and less. A region 240 indicates a chip pocket on the rake face 222 of the cutting tool 200, while a region 250 indicates a chip pocket on the second flank face 218, 224. As depicted in FIG. 5, the chip pocket 250 on the second flank face 218, 224 is considerably increased in size as compared to conventional cutting tools having a second flank face parallel to a tool centre axis. In this way, chip discharge properties at the second flank face are considerably improved in cutting tools provided by the present invention.

On the side of the rake face 212, 222 of the cutting tool 200, the negative rake angle (c.f. THETA1 in FIG. 4) does not degrade the chip pocket 240 on the rake face 212, 222 of the cutting tool 200 and therefore, a protected cutting edge may be achieved by means of the negative rake angle without negatively affecting the chip discharge properties at the rake face 212, 222 of the cutting tool 200. Accordingly, the cutting tool 200 shows improved chip discharge properties as compared to conventional cutting tools.

Figure 6:
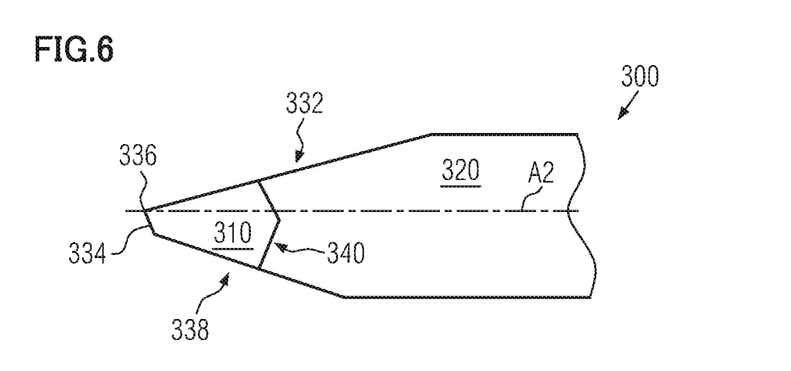
FIG. 6 schematically illustrates a cutting tool in accordance with other illustrative embodiments of the present invention.

FIG. 6 illustrates a cutting tool 300 in accordance with an alternative embodiment of the present invention. The cutting tool 300 has a cutting tool insert 310 and a body portion 320 coupling the cutting tool insert 310 with a shank (not illustrated) of the cutting tool 300. For example, the cutting tool insert 310 is a sintered composition of a tip portion of cBN material and a base portion of carbide material, similar to the configuration of the cutting tool insert 210 of the cutting tool 200 as described above with regard to FIGS. 4 and 5.

The cutting tool 300 has a rake face 332 with a negative rake angle similar to the rake face 212, 222 of the cutting tool 200 as described above with regard to FIGS. 4 and 5. Furthermore, the cutting tool 300 may, alternatively or additionally, have a second flank face 338 besides a first flank face 334, wherein the second flank face 338 is inclined relative to an axis A3 in analogy to the configuration of the second flank face 218, 224 of the cutting tool 200 as described above with regard to FIGS. 4 and 5. The rake face 332 and the first flank face 334 define a cutting edge 336 of the cutting tool 300.

The cutting tool 300 has a further increased brazing interface 340 as compared to the brazing interface 226 of the cutting tool 200 as described above with regard to FIGS. 4 and 5. The brazing interface 340 may be, for example, provided by a concave interface portion of the body portion 320 and a convex interface portion formed in the cutting tool insert 310 as shown in FIG. 6. Particularly, the convex interface portion of the cutting tool insert 310 and the concave interface portion of the body portion 320 are fabricated to match each other and the convex interface portion is received by the concave interface portion to form the stable brazing interface 340 upon connecting the cutting tool insert 310 and the body portion upon brazing.

Figure 7:
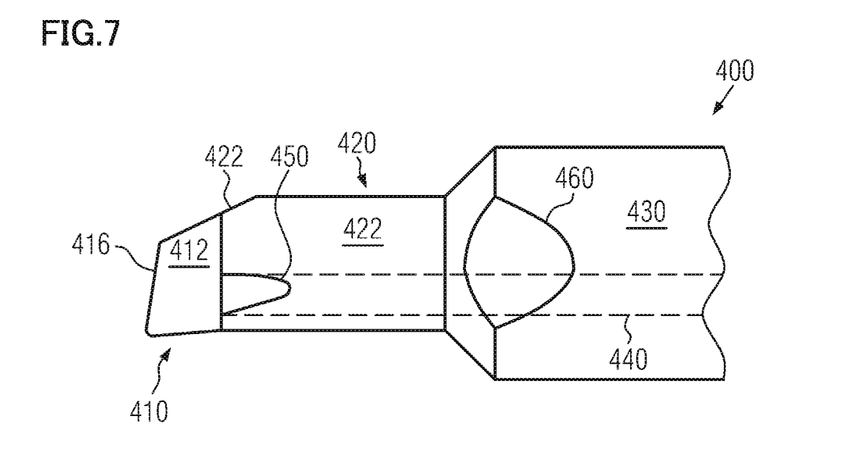
FIG. 7 schematically illustrates cutting tools in accordance with still further illustrative embodiments of the present invention.

With regard to FIGS. 7 to 9, some illustrative embodiments of the present invention will be described in greater detail. FIG. 7 schematically illustrates a side sectional view of a cutting tool 400 having a cutting tool insert 410, a body portion 420 and a shank 430. The body portion 420 and the shank 430 are coupled together and may have a common contact interface. The contact interface may be, for example, located at the beginning of a tapered portion of the shank, as depicted in FIG. 7, without posing any limitation to the present disclosure.

The cutting tool insert 410 as depicted in FIG. 7 has a cutting edge 416 formed adjacent to a rake face 412 of the cutting tool insert 410. The body portion 420 has a rake face 422 adjacent to the rake face 412 of the cutting tool insert 410. In illustrative embodiments, the rake faces 412 and 422 may form a smooth and flat rake face 412, 422 of the cutting tool 400 as illustrated in FIG. 7. The person skilled in the art will appreciate that, although a configuration similar to the cutting tool 200 as discussed above with regard to FIGS. 4 and 5 is depicted in FIG. 7, this does not pose any limitation to the present description and alternatively a cutting tool configuration in accordance with the cutting tool 300 as described above with regard to FIG. 6 may be employed instead.

The cutting tool 400 has a coolant hole 440 formed therein extending through the shank 430 and the body portion 420. An opening 450 of the coolant hole 440 is defined by the location of the coolant hole 440 relative to a centre axis (not illustrated) of the cutting tool 400 and depends on the negative rake angle as will be discussed in greater detail below. The opening 450 of the coolant hole 440 is located in the body portion 420. In special examples, the opening 450 is formed within the rake face 422 of the body portion 420. In this way, an efficient provision of coolant means, e.g. a coolant liquid or coolant gas, may be provided through the coolant hole 440 and the coolant opening 450 to a region close to the cutting tool insert 410 and the cutting edge 416.

Figure 8:
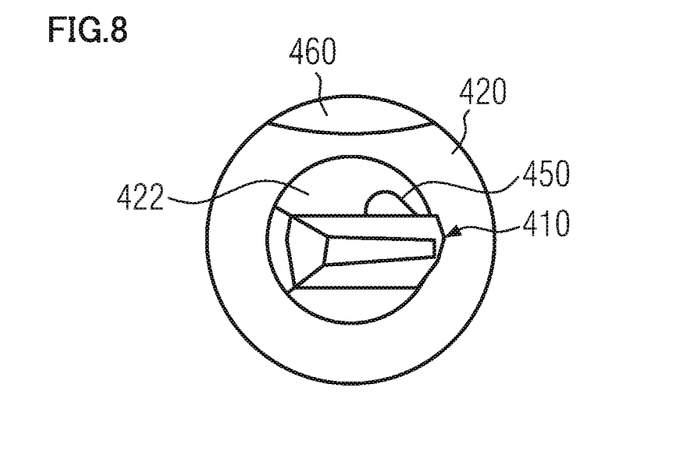
FIG. 8 schematically illustrates cutting tools in accordance with still further illustrative embodiments of the present invention.

FIG. 8 illustrates a top view on the cutting tool 400 in a direction along the coolant hole 440 (c.f. FIG. 7). For example, a grip portion 460 may be formed in the shank 430 indicating an orientation of the rake face 422.

Figure 9:
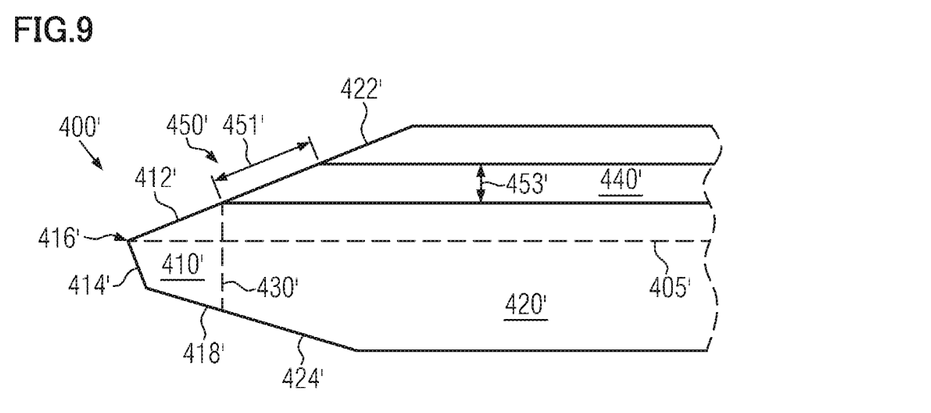
FIG. 9 schematically illustrates cutting tools in accordance with still further illustrative embodiments of the present invention.

FIG. 9 illustrates a cutting tool 400' in a cross-sectional view. The cutting tool 400' has a cutting tool insert 410' and a body portion 420'. The cutting tool insert 410' has a rake face 412' with a negative rake angle and a first flank face 414' defining a cutting edge 416'. Furthermore, the cutting tool insert 410' has a second flank face 418' inclined by a non-negative angle relative to an axis 405' which extends parallel to a centre axis (not illustrated) of the body portion 420' through the cutting tool 400'. As indicated by the broken line 430', the cutting tool insert 410' and the body portion 420' are coupled by a brazing interface 430'. In spite of the illustrated configuration similar to the cutting tool 200 as discussed above with regard to FIGS. 4 and 5, in an alternative embodiment herein, a configuration similar to the cutting tool 300 as discussed above with regard to FIG. 6 may be employed instead.

The body portion 420' has a rake face 422' and a flank face 424'. The rake face 422' may form together with the rake face 412' a smooth flat rake face 412' 422' of the cutting tool 400', as depicted in FIG. 9. Alternatively or additionally, the flank face 424' of the body portion 420' may form a second flank face 418', 424' of the cutting tool 400' together with the second flank face 418' of the cutting tool insert 410', as depicted in FIG. 9. In further alternative embodiments herein, the rake face and/or the flank face may be provided by two distinct flat faces as discussed above.

A coolant hole 440' is formed within the cutting tool 400' such that the coolant hole 440' is formed within the body portion 420'. In accordance with illustrative embodiments, the coolant hole 440' may extend through the body portion 420' in parallel to the axis 405'. An opening 450' of the coolant hole 440' may be formed in the rake face 412', 422' of the cutting tool 400'. In some illustrative embodiments, the coolant hole 420' is formed in the rake face 422' of the body portion 420' and not in the rake face of the cutting tool insert 410'. The person skilled in the art will appreciate that due to the hardness of the cutting tool insert 410', the opening 450' of the coolant hole 440' may be only located in the rake face 422' of the body portion 420' and may not extend into the rake face 412' of the cutting tool insert 410'.

Depending on the negative rake angle of the rake face 412', 422' of the cutting tool 400', an area of the opening 450', indicated in FIG. 9 by double-arrow 451' denoting a diameter of the opening, is greater than a cross-section of the coolant hole 440', as indicated in FIG. 9 by the double-arrow 453' which denotes the diameter of the coolant hole 440'. Particularly, the diameter 453' equals the sine of the absolute value of the negative rake angle times the diameter 451'. In appropriately choosing the negative rake angle, a desired size of the opening 450' of the coolant hole 440' may be chosen. In this way, an efficient cooling of the cutting device 400', particularly of the cutting tool insert 410' and the body portion 420', may be achieved. Particularly, the opening 450' of the coolant hole 440' may be formed in the body portion 420' at minimal distance to the cutting edge 416'. Therefore, a direct supply of coolant means to the cutting tool insert 410' may be provided.

In adjusting a relative lateral displacement of the coolant hole 440' relative to the axis 405' an amount of opening within the rake face 412' of the cutting tool insert 410' and in the rake face 422' of the body portion 420' may be adjusted. Therefore, an advantage of the present invention is to provide a coolant hole that comes into contact with the rake face of the cutting tool. Due to a wider opening of the coolant hole in the rake face with negative rake angle, a comparatively high volume of coolant may be provided to the cutting tool insert and the body portion.

It is further noted that, depending on the position of the coolant hole relative to the axis 405', a shape of the opening 450' may be obtained, such as for example a complete "oval" shape if the coolant hole is disposed in an upper position relative to the axis 405', while an incomplete oval shape of the opening may be obtained in case that the coolant hole is at a position closer to the axis 405' and particularly closer to a centre axis (not illustrated) of the cutting tool.

With regard to FIGS. 10 to 12, a method of fabricating a cutting tool in accordance with some illustrative embodiments of the present invention will be described.

Figure 10:
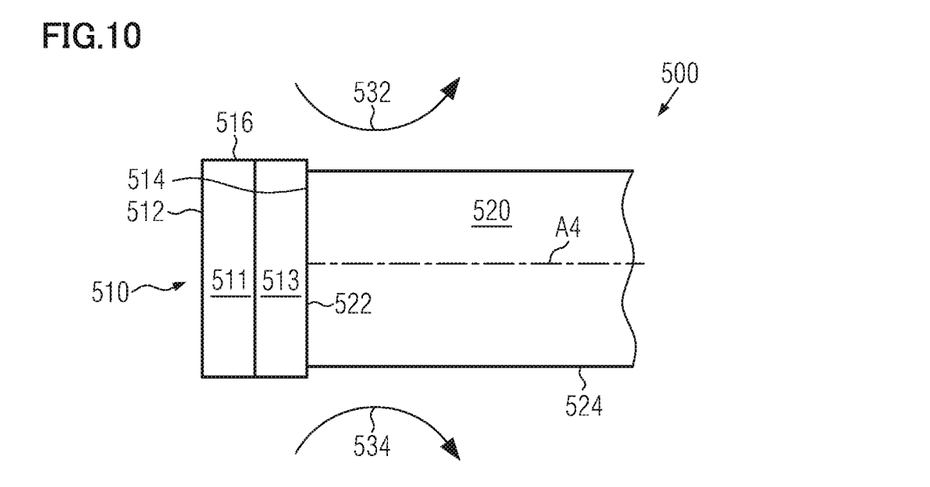
FIG. 10 schematically illustrates a method of fabricating a cutting tool in accordance with some illustrative embodiments of the present invention.

FIG. 10 depicts a cutting tool 500 at an early stage during fabrication, wherein a cutting tool insert portion 510 is coupled with a body portion 520. The coupling of the cutting tool insert portion 510 and the body portion 520 is achieved by performing a brazing process. For example, titan, silver (as a main component) and copper may be used as a braze material to connect the cutting tool insert portion 510 with the body portion 520 in the brazing process. Accordingly, a brazing interface 522 is formed in the brazing process.

The cutting tool insert portion may be provided herein as a sintered composite of a cBN material layer 511 and a carbide material layer 513. The sintered composition may be, for example, obtained by disposing a cBN material layer 511 on a carbide material layer 513 and performing a sintering process for sintering the cBN material layer 511 and the carbide material layer 513 together to give a cBN/carbide blank body 511, 513 as represented 510. The cBN/carbide blank body may be subsequently cut into shape to result in the cutting tool insert portion 510. For example, a cylindrical blank body may be formed in this way.

The cutting tool insert portion 510 may be, in accordance with a special illustrative example, of a cylindrical shape, having a top surface 512 of cBN material and a lower surface of carbide material for contacting the body portion 520.

Prior to brazing, the cutting tool insert portion 510 is disposed on the body portion 520 such that the top surface 512 and a lateral face 516 of the cutting tool insert portion 510 is exposed, while the lower face of the cutting tool insert portion 510 contacts a face of the body portion 520 which will provide the brazing interface 522 after the brazing process is completed.

Subsequently to the brazing process, a first grinding process 532 is applied to the cutting tool 500 for removing material of the cutting tool insert portion 510 and the body portion 520 in a part of the lateral surface of the cutting tool 500. In some special illustrative example, the grinding process 532 may be a grinding process employing a wheel grinder which therefore represents an easy grinding process.

Subsequent to the first grinding process 532, a second grinding process 534 may be applied to the cutting tool 500 at a side of the cutting tool 500 opposite to the previously-grinded lateral surface. In a special illustrative example herein, the second grinding process may be performed employing a grinding wheel for easily performing the grinding process.

Alternatively, the second grinding process may be performed prior to the first grinding process.

Figure 11:
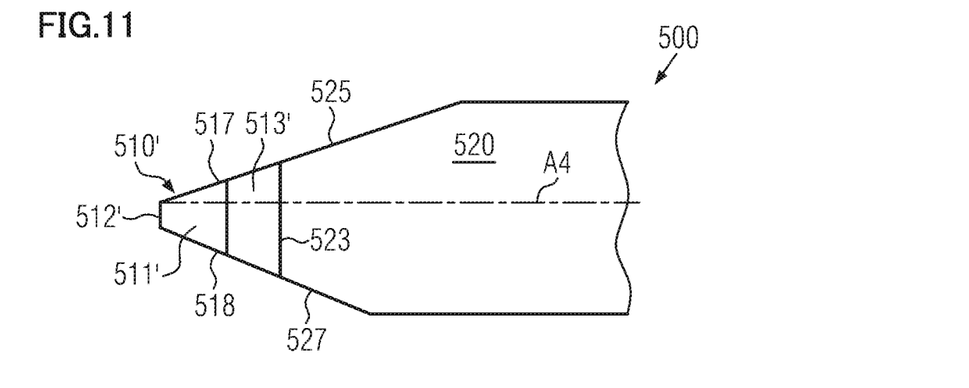
FIG. 11 schematically illustrates a method of fabricating a cutting tool in accordance with some illustrative embodiments of the present invention.

FIG. 11 illustrates the cutting tool 500 at a later phase during fabrication, and particularly after the grinding processes 532 and 534 are completed. Particularly, the first grinding process 532 resulted in a flat rake face 517 formed in the cutting tool insert portion 510' and a flat rake face 525 formed in the body portion 520. In applications relating to cutting tools configured to process low diameter holes, the rake faces 517 and 525 will form a smooth rake face 517, 525 of the cutting tool 500. As a result of the second grinding process 534, a flat flank face 518 is formed in the cutting tool insert portion 510' and a flat flank face 527 is formed in the body portion 520. In cutting tools configured to perform inner diameter processing in low diameter holes, the flank faces 518 and 527 form a smooth flat flank face 518, 527 of the cutting tool 500. Furthermore, the upper surface 512 of the cutting tool insert portion 510' is effectively reduced to the reduced upper surface 512', while the brazing interface 522 is reduced to the brazing interface 523. As explained above, the brazing interface 523 is, in spite of the first and second grinding processes, still large enough to provide sufficient stability to the cutting tool 500. The person skilled in the art will appreciate that in appropriately choosing the negative rake angle of the rake face 517, 525 of the cutting tool 500 and an appropriate inclination of the flank face 518, 527, a desired size of the brazing interface 523 is obtained as pointed out above.

After having completed the grinding processes 532, 534, the cutting tool insert portion 510' has shaped portions 511' and 513' representing a pre-processed tip portion (c.f. 511' in FIG. 11) and a base body 513'.

Figure 12:
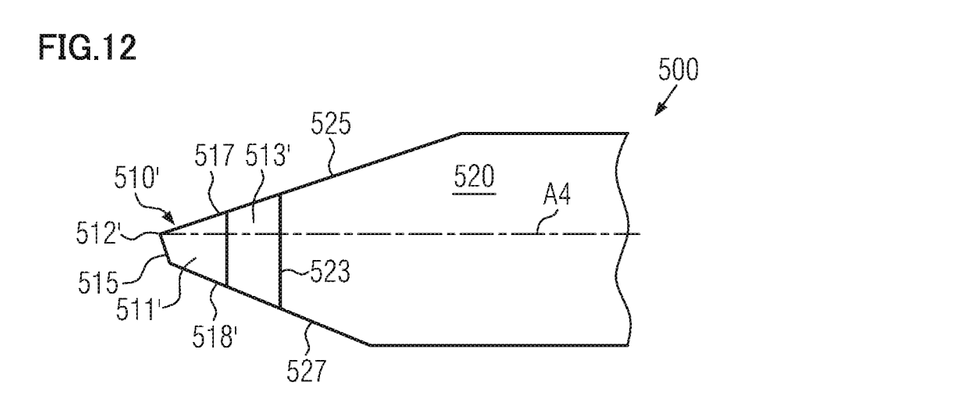
FIG. 12 schematically illustrates a method of fabricating a cutting tool in accordance with some illustrative embodiments of the present invention.

FIG. 12 illustrates the cutting tool 500 at a more advanced stage during fabrication, particularly after a third grinding process has been performed. As a result of the third grinding process, a first flank face 515 is formed in the top surface 512'(c.f. FIG. 11) of the tip portion 513' and a second flank face 518' is formed in the flank face 518 (c.f. FIG. 11).

In additional processing steps, a coolant hole, such as described above with regard to FIGS. 7 to 9 may be provided in the cutting tool 500. The person skilled in the art will appreciate that prior to performing the first and second grinding processes 532 and 534 (c.f. FIG. 10 above), a coolant hole (not illustrated) may be formed within the cutting tool 500 after the brazing process is performed. Alternatively, a coolant hole may be provided within the body portion 520 prior to coupling the body portion 520 and the cutting tool insert portion 510, i.e. before the brazing process. The person skilled in the art will appreciate that a position of a coolant hole with regard to the axis A4 and in selecting a specific negative rake angle, determines the size and shape of an opening of the coolant hole which will be formed in the rake face 525 of the body portion 520 (c.f. FIG. 11).

With regard to FIGS. 13 to 15, a method of fabricating a cutting tool in accordance with some other illustrative embodiments of the present invention will be described.

Figure 13:
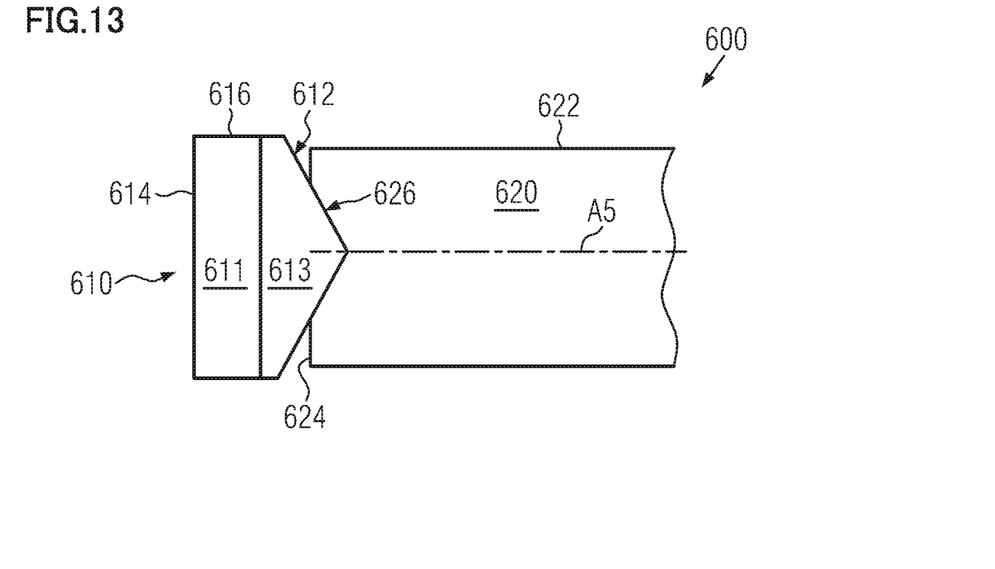
FIG. 13 schematically illustrates a method in accordance with other illustrative embodiments of the present invention.

FIG. 13 depicts a cutting tool 600 at an early stage during fabrication, wherein a cutting tool insert portion 610 is coupled with a body portion 620. The coupling of the cutting tool insert portion 610 and the body portion 620 is achieved by performing a brazing process. For example, titan, silver (as a main component) and copper may be used as a braze material to connect the cutting tool insert portion 610 with the body portion 620 in the brazing process. Accordingly, a brazing interface 622 is formed in the brazing process.

The cutting tool insert portion 610 may be provided herein as a sintered composite of a cBN material layer 611 and a carbide material layer 613. The sintered composition may be, for example, obtained by disposing a cBN material layer 611 on a carbide material layer 613 and performing a sintering process for sintering the cBN layer 611 and the carbide layer 613 to give a cBN/carbide blank body, e.g. a cylindrical blank body similar to the blank body 510 above. In a subsequent process, the cBN/carbide blank body may be cut into shape for forming a convex shaped carbide material layer 613 as illustrated in FIG. 13, thereby resulting in the cutting tool insert portion 610 as depicted in FIG. 13. For example, the cBN/carbide blank may be cut and grinded to obtain a convex surface portion in the carbide material layer, such as for example a wedge-shaped carbide layer portion as indicated by reference numeral 613 in FIG. 13. Furthermore, a matching concave surface portion is formed in one of an upper or lower surface of the body portion 620 such that the concave surface portion 626 of the body portion 620 matches with the convex carbide layer portion 613 of the cutting tool insert portion 610. For example, a wedge-shaped concave groove may be formed within the upper surface of the body portion 620.

The cutting tool insert portion 610 may be, in accordance with a special illustrative example, of a cylindrical shape, having a top surface 612 of cBN material and a lower surface of carbide material for contacting the body portion 620. The cutting tool insert portion 610 is disposed on the body portion 620 such that the top surface 612 and a lateral face 616 of the cutting tool insert portion 610 is exposed, while the lower face of the cutting tool insert portion 610 contacts a face of the body portion 620 which will provide the brazing interface 622.

Subsequently to the brazing, a first grinding process (not illustrated) is applied to the cutting tool 600 for removing material of the cutting tool insert portion 610 and the body portion 620 in a part of the lateral surface of the cutting tool 600. In some special illustrative example, the grinding process may be a grinding process employing a wheel grinder which therefore represents an easy grinding process.

Subsequent to the first grinding process, a second grinding process (not illustrated) may be applied to the cutting tool 600 at a side of the cutting tool 600 opposite to the previously-grinded lateral surface. In a special illustrative example herein, the second grinding process may be performed employing a grinding wheel for easily performing the grinding process.

Alternatively, the second grinding process may be performed prior to the first grinding process.

Figure 14:
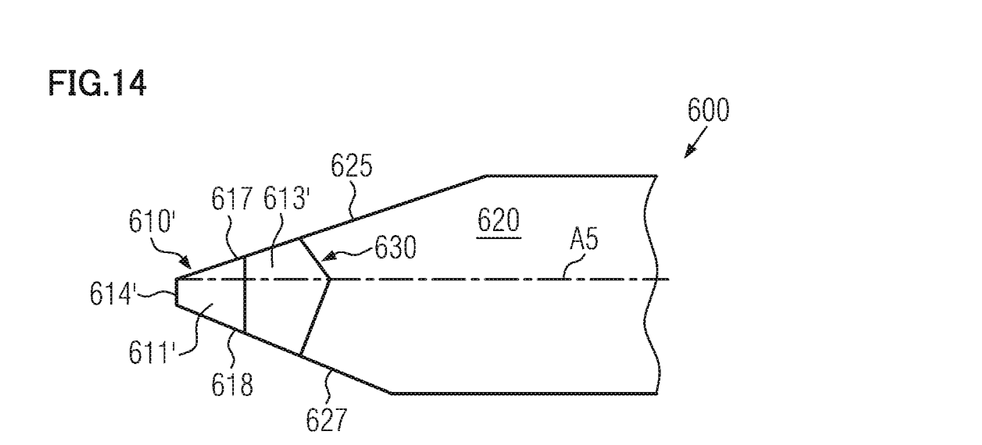
FIG. 14 schematically illustrates a method in accordance with other illustrative embodiments of the present invention.

FIG. 14 illustrates the cutting tool 600 at a later phase during fabrication, and particularly after the first and second grinding processes are completed. Particularly, the first grinding process 632 resulted in a flat rake face 617 formed in the cutting tool insert portion 610 and a flat rake face 625 formed in the body portion 620. For cutting tools configured to process low diameter holes, the rake faces 617 and 625 will form a smooth rake face 617, 625 of the cutting tool 600. As a result of the second grinding process 634, a flat flank face 618 is formed in the cutting tool insert portion 610' and a flat flank face 627 is formed in the body portion 620. In cutting tools configured to perform inner diameter processing in low diameter holes, the flank faces 618 and 627 form a smooth flat flank face 618, 627 of the cutting tool 600. Furthermore, the upper surface 614 of the cutting tool insert portion 610' is effectively reduced to the reduced upper surface 614', while the brazing interface 626 is reduced to the brazing interface 630. As explained above, the brazing interface 630 is, in spite of the first and second grinding processes, still large enough to provide sufficient stability to the cutting tool 600. The person skilled in the art will appreciate that in appropriately choosing the negative rake angle of the rake face 617, 625 of the cutting tool 600 and an appropriate inclination of the flank face 618, 627, a desired size of the brazing interface 623 is obtained.

Figure 15:
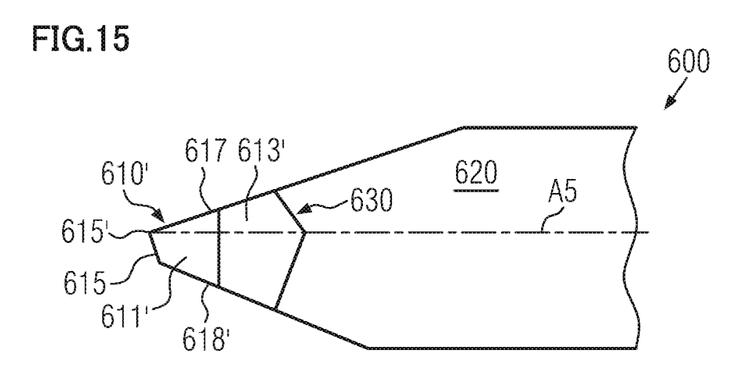
FIG. 15 schematically illustrates a method in accordance with other illustrative embodiments of the present invention.

FIG. 15 illustrates the cutting tool 600 at a more advanced stage during fabrication, particularly after a third grinding process has been performed. As a result of the third grinding process, a first flank face 615 is formed in the top surface 612'(c.f. FIG. 14) and a second flank face 618' is formed in the flank face 618 (c.f. FIG. 14).

In additional processing steps, a coolant hole, such as described above with regard to FIGS. 7 to 9 may be provided in the cutting tool 600. The person skilled in the art will appreciate that prior to performing the first and second grinding processes, a coolant hole (not illustrated) may be formed within the cutting tool 600 after the brazing process is performed. Alternatively, a coolant hole may be provided within the body portion 620 prior to coupling the body portion 620 and the cutting tool insert portion 610, i.e. before the brazing process. The person skilled in the art will appreciate that a position of a coolant hole with regard to the axis A5 and in selecting a specific negative rake angle, determines the size and shape of an opening of the coolant hole which will be formed in the rake face 625 of the body portion 620 (c.f. FIG. 14).

Accordingly, in performing the method as described above with regard to FIGS. 13 to 15, a cutting tool may be fabricated similar to the cutting tool 300 as discussed above with regard to FIG. 6.

The person skilled in the art will appreciate that in providing a rake face with negative rake angle and an inclined flank face, a chip pocket on the flank face may be increased, while still a brazing interface of more than 40% of a diameter of the cutting tool may be provided, such that an efficient bonding strength is obtained. The person skilled in the art will appreciate that, depending on the rake angle and the inclination, a brazing interface of 40 -50% of the diameter of the cutting tool may be obtained.

According to the invention, a cutting tool with improved chip discharge properties and abrasive resistance is provided by at least one of forming a negative rake angle and forming an inclined flank face relative to a centre axis of the cutting tool.

Cutting tools as described above with regard to illustrative embodiments of the present disclosure may be in some illustrative applications employed in boring tools. Alternatively, cutting tools as described above may be employed in milling devices or lathe devices.

The person skilled in the art will appreciate that in providing a cutting tool with a centre axis intersecting the cutting edge, a special symmetrical configuration of the cutting tool is provided which may be further stabilized when compared to cutting tools having centre axis that do not intersect the cutting edge. Accordingly, cutting tools as described above may be in accordance with some special illustrative embodiments configured such that the centre axis intersects the cutting edge.

The present invention provides in various aspects a cutting tool which comprises a cutting tool insert with a tip portion of cBN material having a cutting edge formed therein and a base portion forming a sintered composition with the tip portion, and a body portion coupling the cutting tool insert with a shank of the cutting tool, wherein the cutting tool insert has a rake face and a first flank face defining the cutting edge. In one aspect, the rake face has a negative rake angle relative to an axis parallel to a centre axis of the body portion. In another aspect, a second flank face defining a further edge with the first flank face is formed such that the cutting edge and the further edge do not have a common vertex. Herein the second flank face is tilted with respect to an axis parallel to a centre axis of the body portion by an angle greater than 0°.

REFERENCE SIGNS LIST

100, 130', 200, 300, 400, 400', 500, 600 cutting tool, 110, 210, 310, 410, 410' cutting tool insert, 111 base, 112, 122, 132', 212, 222, 332, 412, 412', 422, 422', 517, 525 rake face, 113 cutting part, 114, 134, 134', 214, 334, 414', 515, 615 first flank face, 116, 136, 136', 218, 224, 338, 418', 518', 618' second flank face, 120 shank body, 124, 418', 424' flank face, 131 workpiece, 140' axis, 142, 142' angle, 216, 336, 416, 416' cutting edge, 220, 320, 420, 420', 520, 620 body portion, 226, 340, 430', 522, 523, 622, 626, 630 brazing interface, 232 surface, 234 hole, 240, 250 region, 405' axis, 430 shank, 440, 440' coolant hole, 450, 450' opening, 460 grip portion, 510, 510', 610, 610' cutting tool insert portion, 511, 611 cBN material layer, 511', 513' shaped portion, 512, 512', 612 top surface, 513, 613 carbide material layer, 513' tip portion, 516, 616 lateral face, 517, 525, 617, 625 flat rake face, 518, 527, 618, 627 flat flank face, 614, 614' upper surface, 626 concave surface portion.

The invention claimed is:

1. Cutting tool, comprising:
a cutting tool insert with a tip portion of cBN material having a cutting edge formed therein and a base portion forming a sintered composition with the tip portion, and
a body portion coupling the cutting tool insert with a shank of the cutting tool,
wherein the cutting tool insert has a rake face and a first flank face defining the cutting edge and a second flank face defining a further edge with the first flank face such that the cutting edge and the further edge do not have a common vertex,
wherein the second flank face is tilted with respect to an axis parallel to a center axis of the body portion by an angle greater than 0°,
wherein an angle THETA2 between the second flank face and the axis parallel to the center axis of the body portion is in a range from 25° to 60°.

2. Cutting tool in accordance with claim 1, wherein an angle THETA between the rake face and the second flank face is in a range from 35° to 7°.

3. Cutting tool in accordance with claim 1, wherein an angle THETA1 between the rake face and the axis parallel to the center axis of the body portion is in a range from 5° to 40°.

4. Cutting tool in accordance with claim 1, wherein the cutting edge is smaller than 5 mm.

5. Cutting tool in accordance with claim 1, wherein the base portion and the body portion are of carbide material and form a brazed composition.

6. Cutting tool in accordance with claim 1, wherein the body portion has a concave interface portion and the base portion has a convex interface portion matching the concave interface portion such that the convex interface portion is received by the concave interface portion.

7. Cutting tool in accordance with claim 1, further comprising a coolant hole formed within the body portion and extending through the body portion along a direction parallel to the axis of the body portion, wherein the rake face of the cutting tool insert extends smoothly into the body portion forming a rake face in the body portion and the opening of the coolant hole being located within the rake face of the body portion.

8. Boring tool, comprising a shank and a cutting tool in accordance with claim 1, the shank being coupled to the cutting tool in forming a contact interface with the body portion.

9. Cutting tool in accordance with claim 1, wherein the rake face of the cutting tool insert extends smoothly into the body portion forming a rake face in the body portion,
wherein the second flank face of the cutting tool insert extends smoothly into the body portion forming a second flank face in the body portion,
wherein the rake face of the cutting tool insert and the rake face of the body portion form a same plane and the second flank face of the cutting tool insert and the second flank face of the body portion form a same plane.

10. Cutting tool in accordance with claim 1, wherein the cutting edge is perpendicular to the center axis of the body portion, and
the cutting edge, the first flank face and the second flank face are placed in this order along the center axis of the body portion.

11. Method of manufacturing a cutting tool, the method comprising:
providing a body portion;
providing a cutting tool insert portion;
performing a brazing process for connecting the cutting tool insert portion and the body portion at a common interface;
forming a cutting edge in the cutting tool insert portion by performing a grinding process for forming a rake face in the cutting tool insert portion, and forming a first flank face in the cutting tool insert portion, the first flank face and the rake face defining the cutting edge; and
forming a second flank face defining a further edge in the cutting tool insert portion, the cutting edge and the further edge not having a common vertex,
wherein the second flank face is tilted with respect to an axis parallel to a center axis of the body portion by an angle greater than 0°.

* * * * *

UNITED STATES PATENT AND TRADEMARK OFFICE
CERTIFICATE OF CORRECTION

Page 1 of 1

PATENT NO. : 10,040,126 B2
APPLICATION NO. : 15/320580
DATED : August 7, 2018
INVENTOR(S) : Christoph Zeiner et al.

It is certified that error appears in the above-identified patent and that said Letters Patent is hereby corrected as shown below:

In the Claims

In Claim 2, Column 13, Line 2, "between the rake face and the second flank face is in a range from 35° to 7°" should be -- between the rake face and the second flank face is in a range from 35° to 70° --

Signed and Sealed this
Eleventh Day of December, 2018

Andrei Iancu
*Director of the United States Patent and Trademark Office*